Oct. 6, 1959     L. HENRY     2,907,471
METAL CABINET STRUCTURES

Filed Jan. 13, 1958     10 Sheets-Sheet 1

Inventor
Louis Henry
By
Watson, Cole, Grindle + Watson
Attorneys

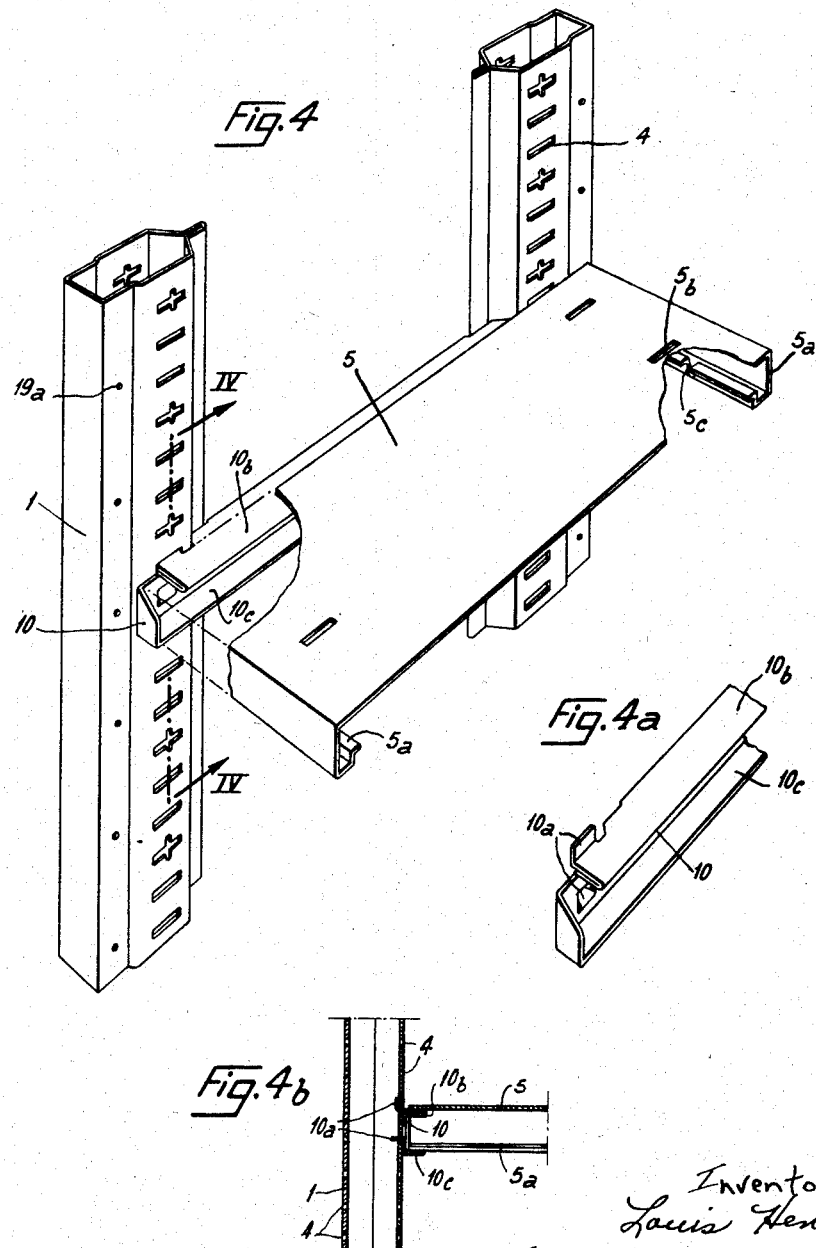

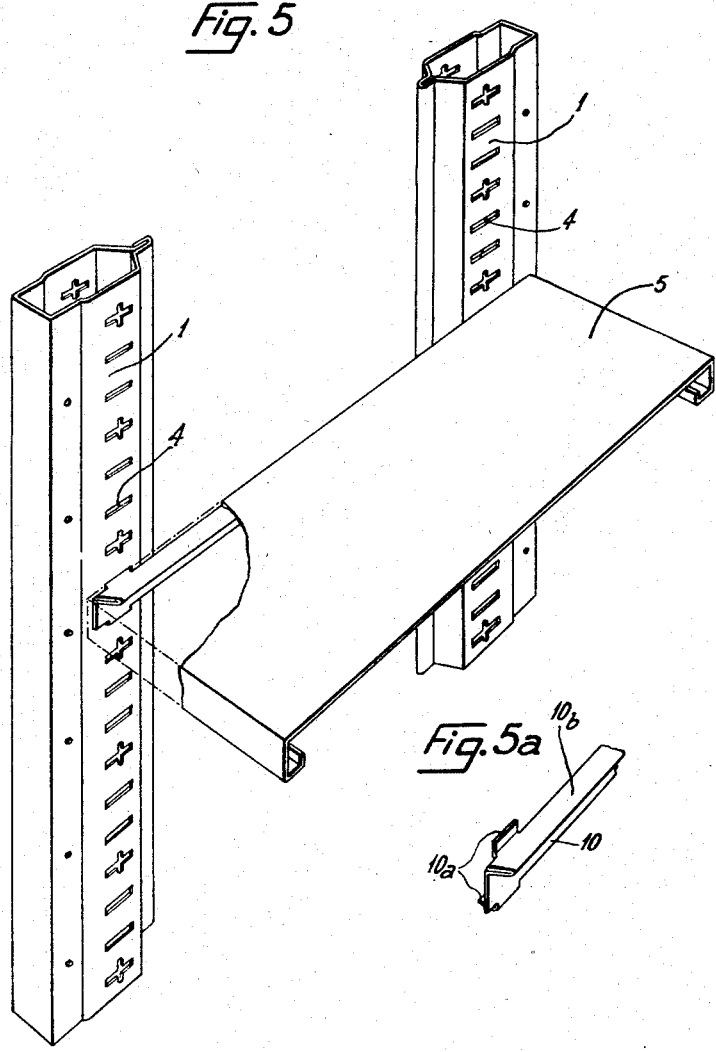

Oct. 6, 1959 L. HENRY 2,907,471
METAL CABINET STRUCTURES
Filed Jan. 13, 1958 10 Sheets-Sheet 6
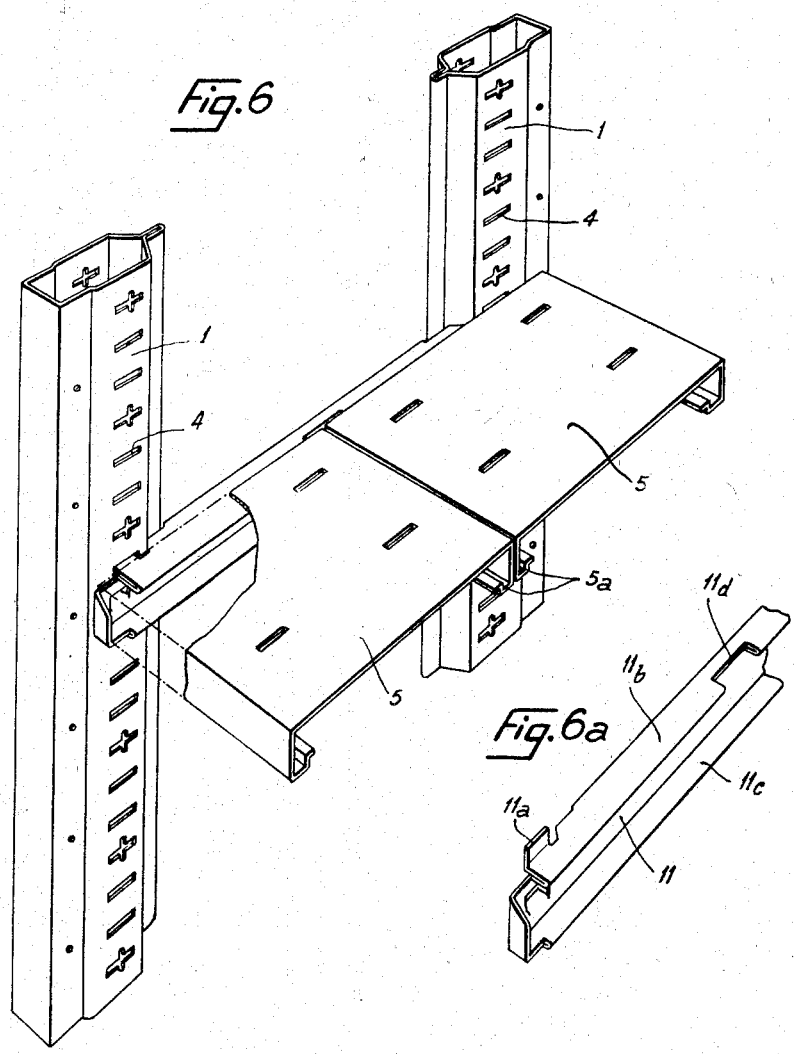
Inventor
Louis Henry
By
Watson, Cole, Grindle & Watson
Attorneys

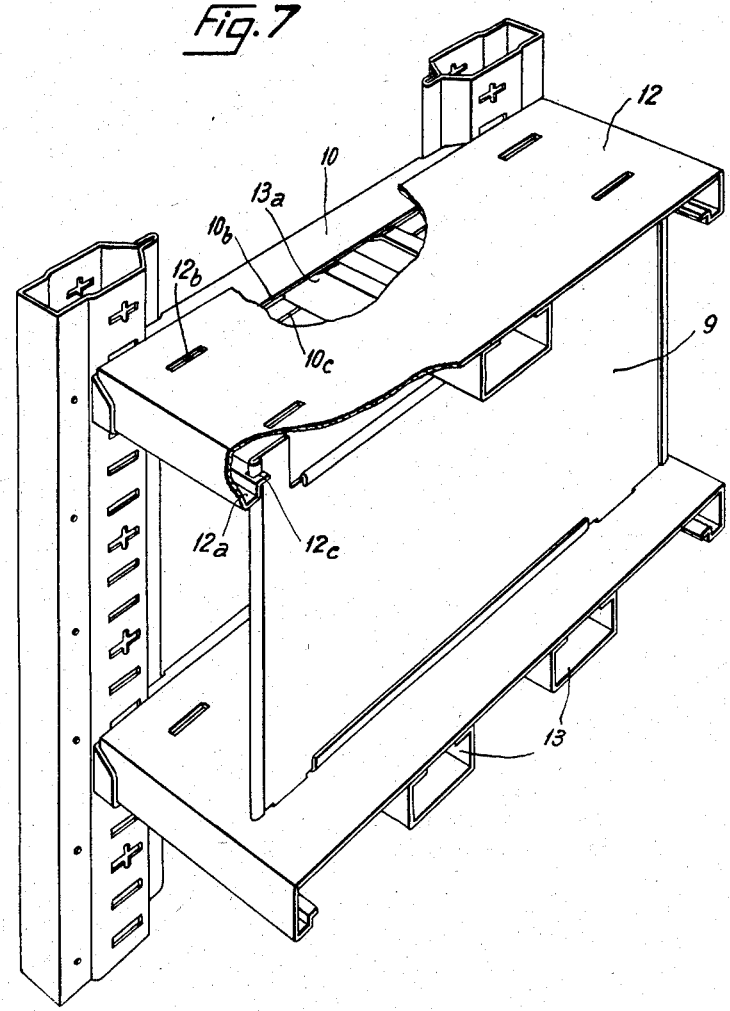

Oct. 6, 1959  L. HENRY  2,907,471
METAL CABINET STRUCTURES
Filed Jan. 13, 1958  10 Sheets-Sheet 8
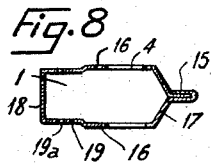
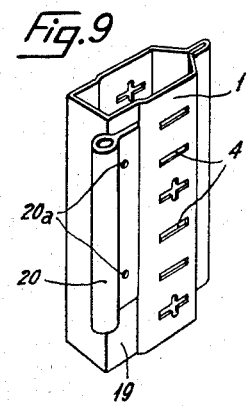
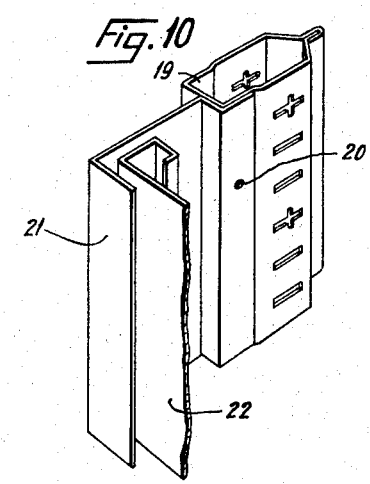
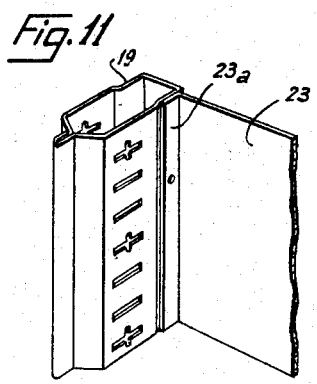
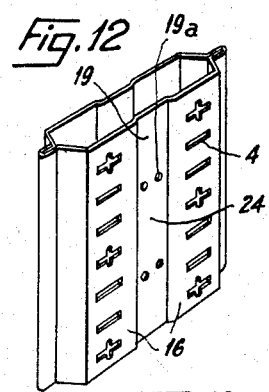
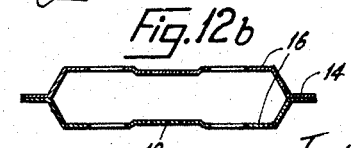
Inventor
Louis Henry
By
Watson, Cole, Grindle & Watson
Attorneys

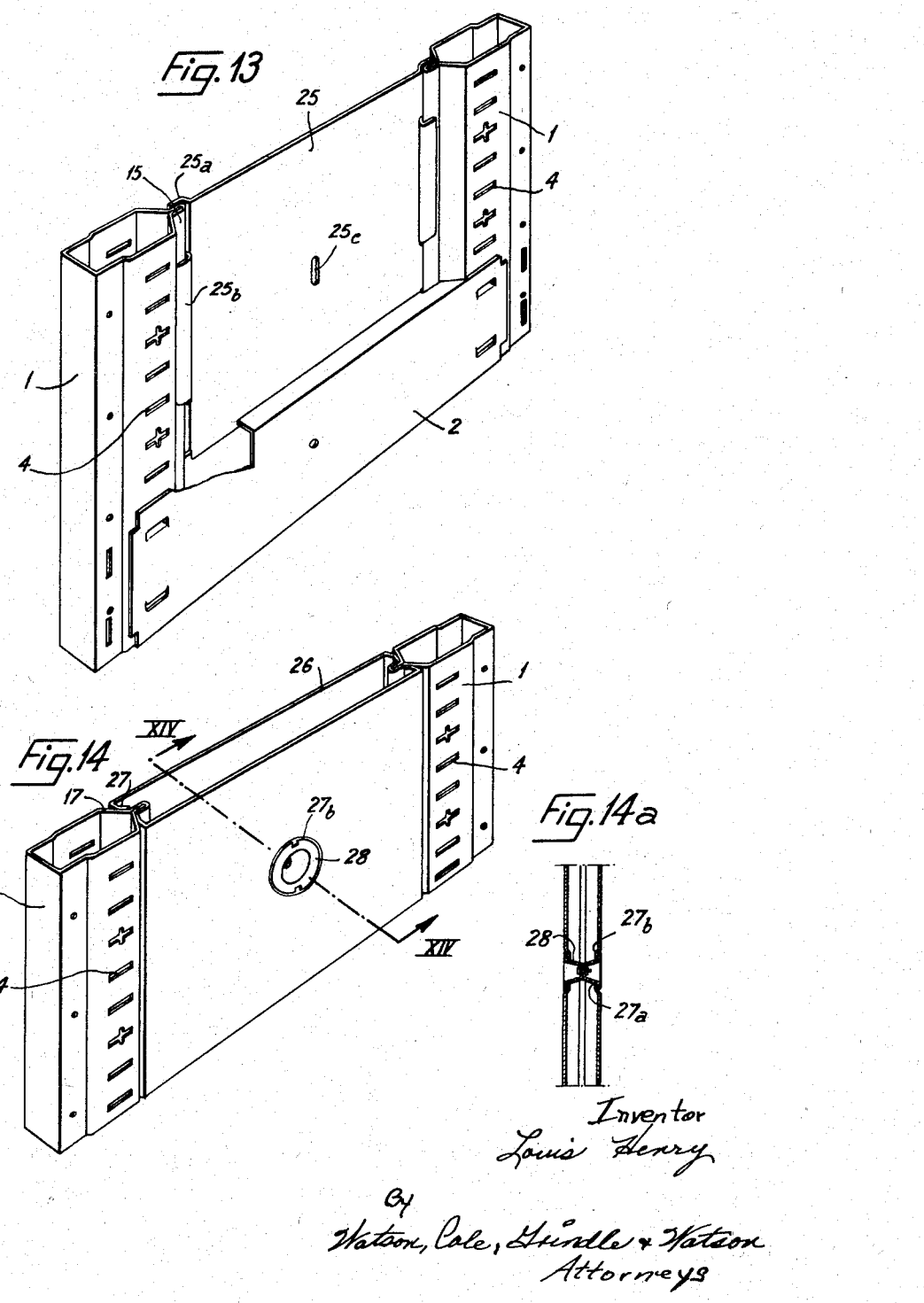

Oct. 6, 1959 L. HENRY 2,907,471
METAL CABINET STRUCTURES
Filed Jan. 13, 1958 10 Sheets—Sheet 10

Inventor
Louis Henry
By
Watson, Cole, Grindle & Watson
Attorneys

United States Patent Office 2,907,471
Patented Oct. 6, 1959

2,907,471

METAL CABINET STRUCTURES

Louis Henry, Strasbourg, Bas-Rhin, France, assignor to Forges de Strasbourg (Societe Anonyme), Paris, France, a company of France Application January 13, 1958, Serial No. 708,595

Claims priority, application France February 4, 1957

8 Claims. (Cl. 211—136)

This invention relates to metallic articles of furniture, more especially cabinets and shelving usable for various purposes, including the storage of files and other articles. It is a general object of this invention to provide an improved and simplified construction for such articles of furniture that will be simple to manufacture, strong, rugged and versatile.

In one conventional class of metallic shelf-stands or cabinets, uprights are provided in the form of angle elements and side and rear walls, as well as shelves, are secured to the uprights with screws. Such shelving is usually very rugged and is frequently used in warehouses and the like for the storage of heavyweight articles such as mechanical parts. However the structure is quite long to assemble and the number and disposition of the shelves therein cannot easily be altered.

In another and more lightweight type of storage structure the uprights are omitted and the side walls are provided in the form of suitable flanged sheeting, while the rear wall and shelves are screwed to the side walls as in the first type. This construction is open to the same objections as those indicated above.

With a view to render the number and position of the shelves easier to modify according to requirements, it has been proposed to form the uprights or sides of the shelf-stands with slots or recesses adapted to receive lugs projecting from the ends of the shelves or brackets which in turn support the shelves. The resulting structures have been relatively expensive and/or unattractive in aspect.

Some types of shelving heretofore proposed have been convertible to cabinets having swing-doors, or folding, sliding or rolling doors. Such articles have usually been quite satisfactory but their cost increases at a considerable rate with increase in the depth dimension. Moreover the space required for door clearance is often prohibitive and if it is attempted to overcome this difficulty by the provision of rolling-curtain type doors the resulting closure is generally fragile and quickly put out of order.

With the object of overcoming the above difficulties and providing a generally more satisfactory type of metallic storage structure than heretofore available, the invention essentially provides structure having a simple rugged framework comprising shaped sheet metal uprights having a box-shaped cross-section, at least one wall of which is formed with longitudinally spaced slots, cross members interconnecting said uprights into a rigid structural framework, and shelves supported through means engageable with selected ones of said slots, means being preferably further provided in association with the uprights for assembling thereto various accessory parts that may be required including side and rear walls, partitions and/or doors.

The invention will thus make it possible to construct a wide range of different types of metallic storage structure capable of meeting diversified demands, from a small number of simple standard components.

The above and further objects and advantages of the invention together with the novel features thereof will stand out clearly from the ensuing description relating to embodiments of the invention selected by way of illustration but not of limitation. In the accompanying drawings:

Fig. 4 is a similar view showing the structure and assembly of a shelf;

Fig. 4a is a detail view of a shelf supporting means;

Fig. 4b is a fragmentary section on line IV—IV of Fig. 4;

Figs. 5 and 5a are respectively similar to Figs. 4 and 4a but relate to a modification;

Figs. 6 and 6a are again respectively similar to Figs. 4 and 4a but illustrate another modification;

Fig. 7 is a perspective view showing reinforced shelves;

Figs. 8 and 8a are sectional views showing modifications of uprights usable in the invention;

Figs. 9, 10 and 11 illustrate in perspective the manner in which various accessory components are assembled to the uprights;

Fig. 12 is a perspective view of a double upright;

Figs. 12a and 12b are cross sections through double uprights in modified forms.

Fig. 13 is a perspective view illustrating how a single wall panel can be assembled to the uprights;

Figs. 14 and 14a are views in perspective and in section on line XIV—XIV respectively, showing double wall panels.

In the exemplary embodiment shown, the main framework or skeleton of storage furniture according to the invention essentially comprises uprights 1, made of metal sheeting press-formed to a generally box-shaped prismatic shape, and interconnected at their upper and lower ends by transverse cross members 2 and longitudinal cross members 3. The uprights and cross members can be made to any desired lengths depending on the requisite size of the articles.

Figure 2:
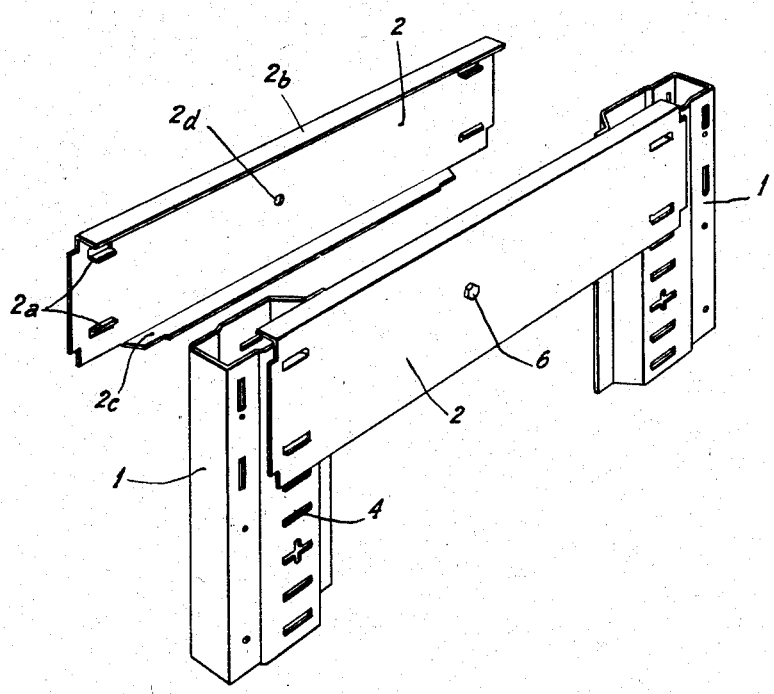
Fig. 2 is a larger-scale perspective view showing the structure and arrangement of the transverse cross members.

Each upright 1 is formed on two opposite ones of its four sides with rows of slots 4 adapted for engagement with the shelf members 5. As shown in Fig. 2, the transverse cross members 2 are profiled elements preferably channel shaped, formed adjacent to their ends with projecting lugs or tenons 2a adapted for engagement with the slots 4 at the upper ends of the uprights. The flanges 2b and 2c of the channel-shaped cross members preferably have a width dimension (normally to the plane of the web of the cross member) such that the two cross members facing each other on opposite sides of a common upright extend into closely spaced relationship, and the lower flanges 2c of the upper cross members, as well as the upper flanges of the bottom cross members, are suitably cut out to conform with the contour of the uprights, while the upper flanges 2b of the top cross members are adapted to engage the upper end faces of the uprights.

After the cross members have been positioned on the uprights the said members are interconnected with screws 6 or other appropriate securing means extending through holes 2d in the webs of the cross members. A single screw such as 6 is found to be sufficient in the case of usual sized cross members, e.g. 30 to 50 centimeters long.

The longitudinal cross members 3 (Fig. 3) desirably comprise C-section elements, as shown, and claws or tenons 3a project from each end of the cross members for engagement with vertical slots 7 in the uprights, in such a way that the wall of the upright beneath the slot 7 is clamped between the inner edge of the tenon 3a and the outer edge of the web 3, and the outer edge of the web 3 applies closely against the corresponding surface portion of the upright thereby providing a strong assembly.

Figure 1:
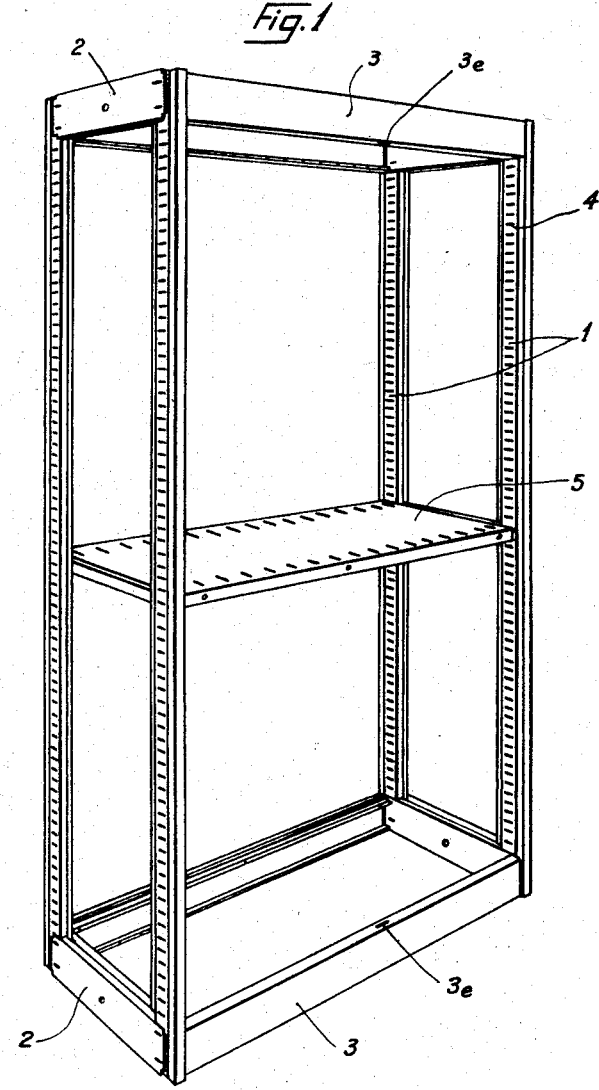
Fig. 1 is a simplified perspective view of framework according to the invention.
Figure 3:
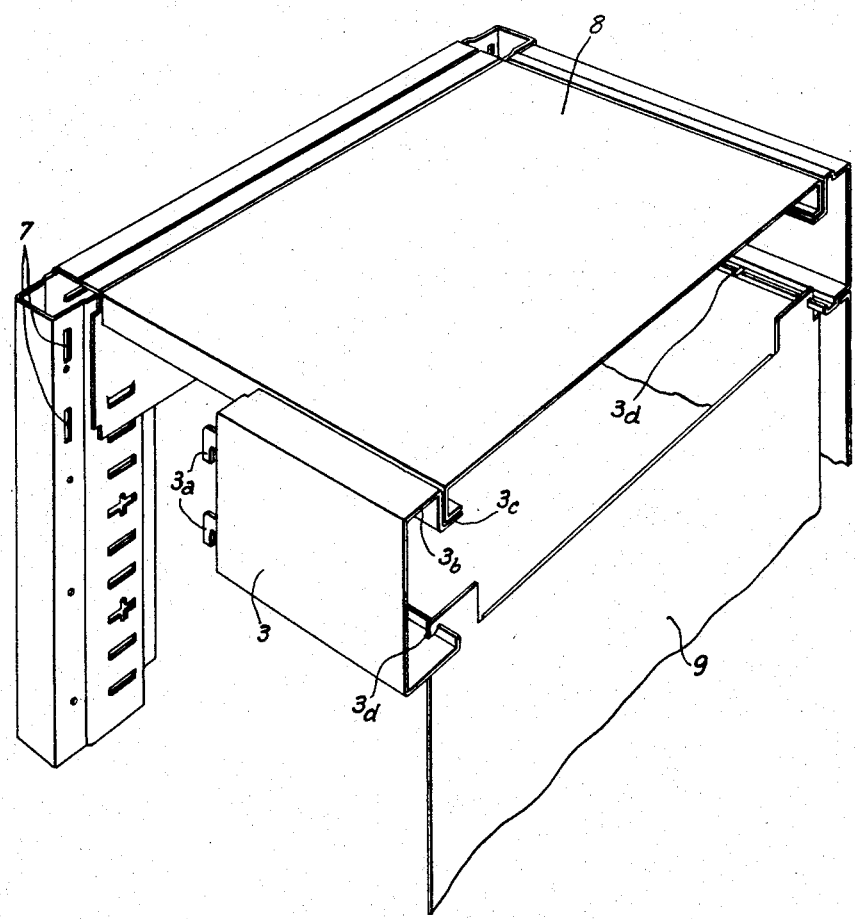
Fig. 3 is a similar showing of the longitudinal cross members.

The upper flange 3b of the cross member can be formed with a further outwardly directed flange 3c adapted to have seated thereon a cover plate 8, or a bottom plate of generally similar shape where the cross member under consideration is a bottom cross member. The lower flange of the cross member is desirably formed with notches 3d uniformly spaced along it for the positioning of intermediate partitions 9 (Fig. 3). As will likewise appear from Fig. 1 the flanges of the cross members 3 can be formed with a recess or slot such as 3e adapted to cooperate with a closure device or door where provided. The lower cross members may be provided of generally similar construction as the upper cross members and are similarly arranged as shown in Fig. 1.

The framework so far described is adapted to support a number of shelves such as 5. In the form of embodiment shown in Figs. 4, 4a and 4b, the shelves are supported on brackets 10 made for example from bent metal strip or sheeting and formed at each end with lugs such as 10a adapted for insertion into selected slots 4 in the uprights. The shelves are supported with their web portions resting on flanges or ribs 10b of the brackets and have flanges 5a resting on further flanges 10c of the brackets, as shown in Fig. 4b.

It will be noted that every fourth slot in the upright is formed with a distinctive shape, e.g. as a cross, to facilitate indexing the position of the shelves.

Each shelf 5 is formed with short transverse slots 5b adjacent its sides adapted to register with the slots 3d in the cross members 3 and serving to mount partition plates such as 9. The flanges 5a of the cross members are desirably formed with corresponding slots 5c for a similar purpose.

In the form of embodiment shown in Figs. 5 and 5a, the brackets 10 and shelves 5 are of more lightweight construction and in this case the slots in the shelves can be omitted since no intermediate partitions would generally be provided in such a construction.

In Figs. 6 and 6a, there is illustrated a portion of a framework structure adapted to receive a pair of juxtaposed shelves 5 to provide a cabinet of increased depth. In this case the brackets 11 used are similar to the brackets 10 in Fig. 4a but are twice as long and are formed in the central portion of their upper flanges 11b with a slot 11d for the insertion of the flanges 5a of the shelves which rest upon the ribs 11c.

Fig. 7 illustrates yet another modification wherein the framework is equipped with reenforced shelves 12. The shelves can be mounted on brackets similar to the brackets 10 previously described. The shelves are reenforced longitudinally by the provision of one or more box-shaped elements 13 having their ends 13a suitably contoured for insertion into the ribs 10b and 10c of the brackets. The box members 13 may be welded to the under face of the shelf or may be provided as removable components to be mounted according to the user's requirements. Each shelf has its web formed with slots 12b and its flanges 12a are formed with slots 12c for engagement with partitions 9 preferably formed with reenforced edges.

Figs. 8 to 12b illustrate various forms in which the uprights 1 can be provided. As indicated earlier the uprights 1 have two parallel faces 16 in which notches 4 are formed. The uprights are desirably made from cut and shaped sheeting and the longitudinal joint between the ends of the sheet may be provided by spot-welding the abutted ends, or a continuous welded seam, or otherwise, as shown at 14 in Fig. 8a, or crimping may be used as shown at 15 in Fig. 8 or in any other convenient manner. The parallel faces 16 are connected with the joints 14 or 15 by way of angular faces 17 which may serve to facilitate the guiding of files where the structure is to be used as a filing cabinet. The sides of the upright are formed, towards the rear end wall 18 of the upright, with steps providing a rebated section 19 and the sides of said rebated section are formed with uniformly spaced holes 19a, which are also visible e.g. in Fig. 4. A predetermined relationship is present between the positioning of the holes 19a and that of the slots 4 in order to permit of a symmetrical assembly of various components to be later described. Thus, door hinges 20 may be applied to the rebates 19 and secured thereto with screws 20a through the holes 19a (Fig. 9). Similarly, a frame 21 can have a side flange thereof secured to the rebate with screws 21a for receiving sliding doors 22. The rebates 19 may further be used for securing a rear panel 23 having its side flange 23a inserted in and concealed by the rebate.

As shown in Figs. 12, 12a and 12b, in cases where a pair of cabinets of the kind described are to be mounted back to back, double uprights 24 may be used wherein the rebates 19 are provided in a central area of the sides between the slotted faces 16. Such double uprights are otherwise generally similar to the single uprights previously described and can be constructed by either crimping or welding the adjacent edges of a press formed sheet, as shown respectively in Fig. 12a and Fig. 12b.

Figs. 13, 14 and 14a illustrate the provision of side walls in the structure. Fig. 13 shows the use of single walls comprising metal panels 25 formed on their side edges with rebates 25a and flanges 25b for inserting them around the joints 14 or 15 of the uprights 1. At the bottom of the structure the rebates 25a are supported on the upper flanges of cross members 2, so that securing means are unnecessary. The panels 25 may be formed with elongated apertures 25c for receiving screws whereby to attach an outer casing panel, if desired.

In cases where neatness of aspect is especially desirable, double walls such as 26 (Fig. 14) can be provided across the uprights 1. The double panels 26 comprise spaced webs formed at their opposite ends with internal folds 27 adapted to engage the slanting faces 17 of the uprights. The double panels are retained in position with a pair of opposed caps 28 (Figs. 14 and 14a) secured in end-to-end engagement by bolts or by means of a bayonet type joint, and engaged in corresponding apertures 27a preferably having an annular rebate around their circumference so that the rim of each cap member 28 lies flush with the surface of the panel.

Figure 15:
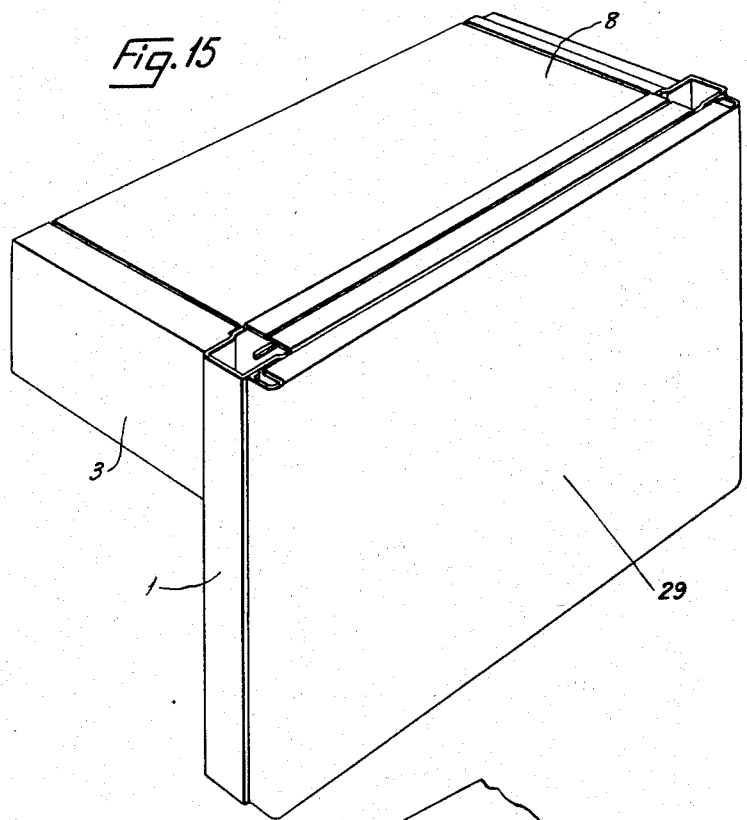
Figs. 15 and 16 are perspective views illustrating the application of an outer panelling to a cabinet constructed from the components of the invention.
Figure 16:
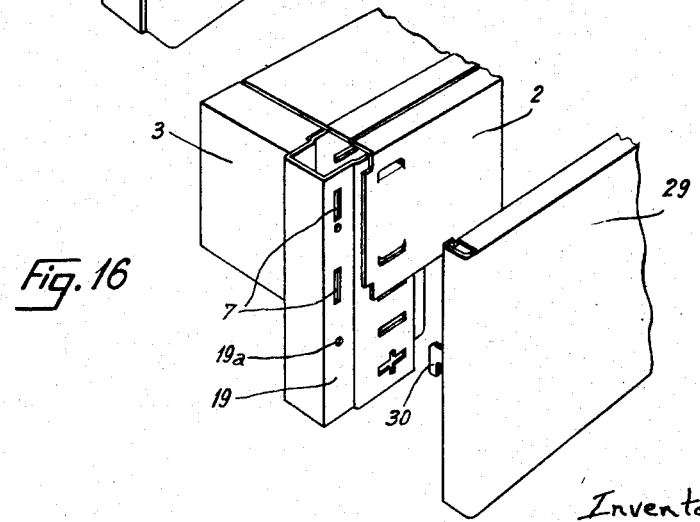

Preferably structure according to the invention is externally fitted after assembly with outer casing panels 29 (Figs. 15 and 16). The casing panels are provided with projecting lugs 30 similar to those provided on the longitudinal cross members 3, and serving to secure the panels by engagement of the lugs with the vertical slots 7 formed in the rebated portion 19 of the uprights opposite from that rebated portion with which the ends of the cross members 3 were connected.

It will be understood that various modifications may be made in the forms of embodiment illustrated and described and certain of the components shown can be replaced by equivalent ones without exceeding the scope of the invention.

What I claimed is:

1. A storage structure of the kind having uprights interconnected by longitudinal and transverse cross-members, wherein the said uprights have a box-like cross-sectional configuration with parallel spaced opposite side faces, the said faces comprising each a longitudinal portion provided with slots uniformly spaced lengthwise of said faces and a rebated portion adjacent on one side to said slotted portion, said rebated portion being provided with slots in the vicinity of the ends of said uprights and with apertures uniformly spaced lengthwise of the said rebated portion, the said longitudinal portions being adjacent, on the other side to oblique faces slanting towards each other and connected into a longitudinal rib.

2. A storage structure as claimed in claim 1 wherein the said faces comprise two longitudinal slotted portions separated by a rebated portion.

3. A storage structure as claimed in claim 1 comprising brackets provided with lugs adapted to be engaged in selected slots of the said longitudinal portions, for supporting shelves having a web and lateral flanges, the said brackets being provided with an upper rib for supporting the web of the shelves and a lower rib for supporting the flanges of said shelves.

4. A storage structure as claimed in claim 3, wherein each bracket is adapted to support a plurality of shelves side by side, said upper rib being provided with notches for the insertion of the flanges of the said shelves.

5. A storage structure as claimed in claim 3 wherein the said shelves are reinforced by box members secured to the web and the height of which is equal to that of the said flanges, the ends of said box members being then adapted to be supported by the said lower rib.

6. A storage structure as claimed in claim 1, wherein said uprights are disposed in pairs with the longitudinal ribs of the uprights facing each other, a wall being inserted between a pair of uprights and guided by the said longitudinal ribs.

7. A storage structure as claimed in claim 6 wherein the said wall comprises a pair of plates provided with longitudinal folds, the said folds engaging said oblique faces and being connected together in their central portion.

8. A storage structure as claimed in claim 1 wherein said transverse cross-members are constituted by two symmetrical portions provided with lugs, said lugs being inserted into corresponding selected slots of said longitudinal portion of the opposite faces and the symmetrical portions being connected to each other, the said symmetrical portions comprising inturned flanges cut out to engage the adjacent faces of the uprights.

References Cited in the file of this patent

UNITED STATES PATENTS

| | | |
|---|---|---|
| 1,227,703 | Ulrich | May 29, 1917 |
| 1,268,509 | Stone | June 4, 1918 |
| 1,401,041 | Chipperfield | Dec. 20, 1921 |
| 1,473,064 | Vance | Nov. 6, 1923 |
| 1,473,817 | Gorsline | Nov. 13, 1923 |
| 1,836,901 | Caldwell et al. | Dec. 15, 1931 |
| 2,667,401 | Knuth | Jan. 26, 1954 |
| 2,760,650 | Franks | Aug. 28, 1956 |

FOREIGN PATENTS

| | | |
|---|---|---|
| 441,801 | Great Britain | Jan. 27, 1936 |
| 596,513 | France | Oct. 26, 1925 |
| 695,180 | Great Britain | Aug. 5, 1953 |